Patented May 12, 1953

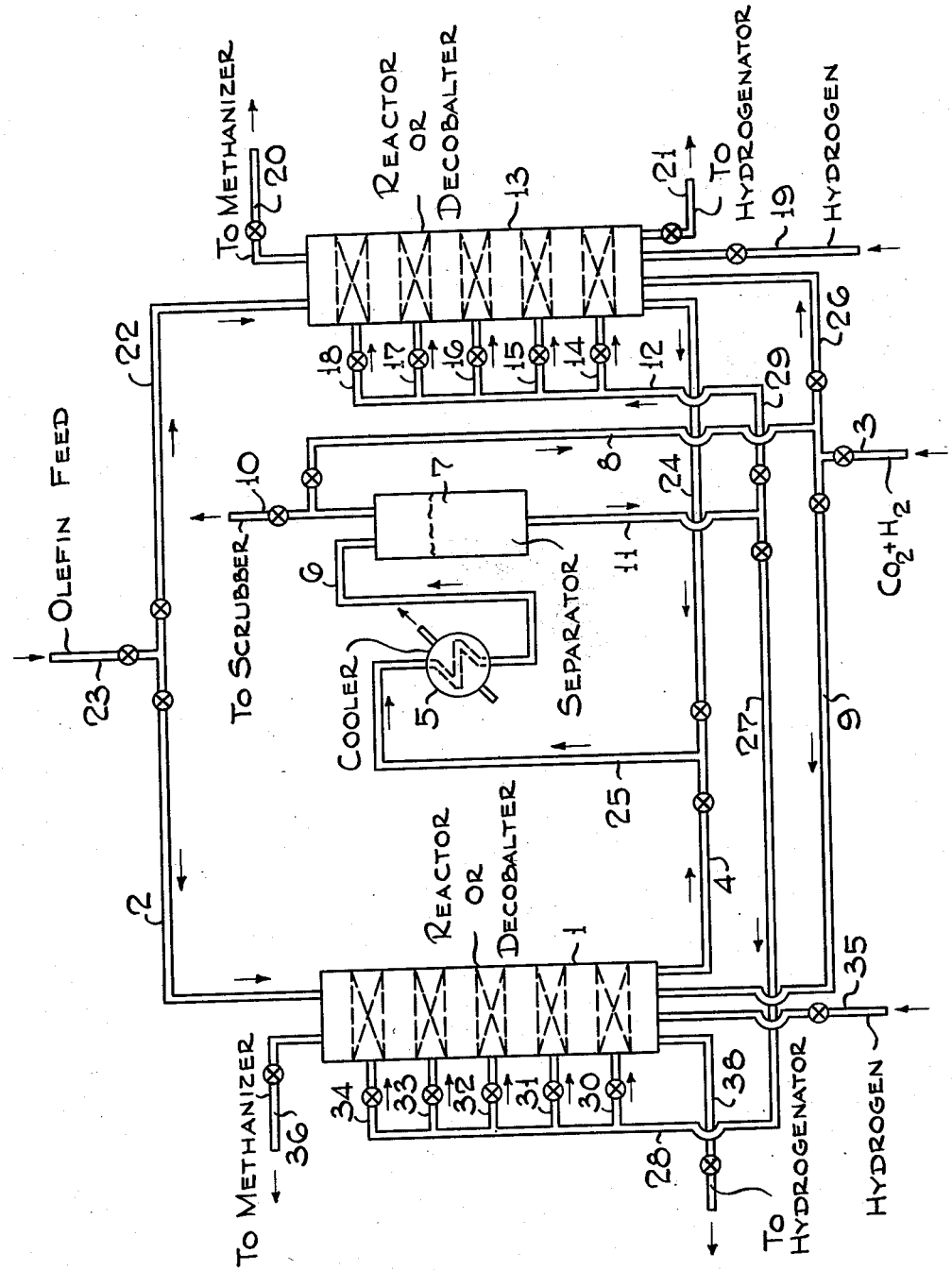

2,638,485

UNITED STATES PATENT OFFICE 2,638,485

DECOBALTING OPERATION IN ALDEHYDE SYNTHESIS

Joseph K. Mertzweiller, Baton Rouge, La., assignor to Standard Oil Development Company, a corporation of Delaware Application April 10, 1948, Serial No. 20,203

8 Claims. (Cl. 260—604)

The present invention relates to the production of oxygenated organic compounds by the catalytic reaction of olefins with hydrogen and carbon monoxide. More particularly, the present invention discloses an improved process for the production of carbonyl compounds and alcohols having one more carbon atom than the olefins from which they are derived by the interaction of said olefins, carbon monoxide and hydrogen, in the presence of a cobalt or iron catalyst. The invention pertains specifically to a process for increasing the length of cycle in an alternate type operation in a carbonylation reaction in which a primary reaction zone and a subsequent catalyst removal zone are operated in such a manner that their functions may be advantageously alternated at will, as will be made clear hereinafter.

It is now well known in the art that oxygenated organic compounds may be synthesized from olefins by reaction of the latter with carbon monoxide and hydrogen in the presence of a catalyst containing cobalt or iron or other carbonylation catalyst in an essentially three stage process. In the first stage, the olefinic material, catalyst, and proper proportions of CO and $H_2$ are reacted to give a product consisting predominantly of aldehydes containing one more carbon atom than the olefin. This oxygenated organic mixture, which contains dissolved in it salts and the carbonyls and molecular complexes of the metal catalyst, is treated in a second stage to cause removal of the soluble metal compounds from the organic material in a catalyst removal zone. The catalyst-free material is then generally hydrogenated to the corresponding alcohols or may be oxidized to the acid.

This carbonylation reaction provides a particularly attractive method for preparing valuable primary alcohols, which find large markets particularly as intermediates for plasticizers, detergents and solvents. Amenable to the reaction are long and short chained olefinic compounds, depending upon the type alcohol desired. Not only olefins, but most organic compounds possessing at least one non-aromatic carbon-to-carbon double linkage may be reacted by this method. Thus straight and branch chained olefins and diolefins such as propylene, butylene, butadiene, pentene, pentadiene, hexene, heptene, styrene, olefin polymers such as di- and tri-isobutylene, hexene and heptene dimers, polypropylene, and olefinic fractions from the hydrocarbon synthesis process, thermal or catalytic cracking operations, and other sources of hydrocarbon fractions containing such olefins may be used as starting material, depending on the nature of the final product desired.

The catalysts for the first stage of the process are usually added in the form of salts of the catalytically active metal with high molecular weight fatty acids, such as stearic, palmitic, oleic, naphthenic, etc. Thus, as examples of suitable catalysts are cobalt stearate, oleate, or naphthenate and iron linoleate. These salts are soluble in the liquid olefin feed and may be supplied to the first stage as hydrocarbon solution or dissolved in the olefin feed.

The synthesis gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g. and at temperatures in the range of about 150°–450° F., and the ratio of synthesis gas to olefin may vary widely; in general, about 2500 to 15,000 cu. ft. of $H_2$+CO per barrel of olefin feed are employed.

At the end of the first stage, when the desired conversion of olefins to oxygenated compounds has been effected, the product and unreacted materials are generally withdrawn to a catalyst removal stage, where dissolved catalyst is removed from the mixture. This is generally accomplished by heating the products in a packed reactor to decompose the carbonyl of the metal catalyst and precipitate the metal, purging the CO formed with hydrogen in a manner disclosed below. The catalyst decomposition temperatures are in the range of about 300–400° F.

From the catalyst removal stage the reaction products, comprising essentially aldehydes, are transferred to a hydrogenation zone, and the carbonyl compounds reduced to alcohols in a manner known per se. The present invention concerns itself principally with the first two stages.

One of the problems involved in the aldehyde synthesis reaction is the fact that the catalyst metal, such as cobalt or iron, reacts with the CO under the synthesis conditions to form the metal carbonyl. There is some basis for belief that the metal carbonyl itself is the catalyst. Cobalt catalyst has been more widely used than iron, and in what follows below it is to be understood that, where cobalt is mentioned, iron may be substituted without substantial change of condition. The cobalt carbonyl remains dissolved in the reaction product and is removed from the reaction zone, resulting in the depletion of the catalyst from that zone. As mentioned above such catalyst dissolved in the reaction product is precipitated in the cobalt removal zone.

There have been several proposals in the past for the most advantageous utilization of the cobalt precipitated in the catalyst decomposition zone by heat and hydrogen. One such is the extraction of the precipitated metal with mineral acid, the conversion of the mineral acid salt into organic cobalt salt, and reuse of the latter in the first stage, an obviously uneconomic procedure. Another proposal has been to reconvert the precipitated cobalt metal with carbon monoxide back to cobalt carbonyl, which can then be dissolved in alcohol and used as cobalt concentrate in the reactor feed. Among other disadvantages is the fact that for this process practically pure CO is required, to prevent formation of hydrocarbon synthesis products. On a commercial scale, this is a definitely uneconomic factor. The most promising proposal has been the utilization of two fixed bed reaction zones in series, in which synthesis gas and olefins are introduced into an initial packed reaction zone containing precipitated cobalt catalyst. The action of the CO upon the metal forms the carbonyl which then promotes the interaction of CO, $H_2$ and the olefin to produce aldehydes. The liquid reaction product from the first stage reactor, which contains dissolved in it cobalt carbonyl, is then introduced into the secondary reaction zone, now functioning as a catalyst removal zone. In this zone, the carbonyl produced in the initial zone is decomposed by heat and hydrogen, and the cobalt collects on the inert packing of the secondary reaction zone. After the cobalt in the initial reaction zone is depleted to a predetermined critical minimum quantity, beyond which the effectiveness of olefin conversion would diminish, the flow of the streams is reversed with respect to the initial and secondary reaction zones, so that now the synthesis gas and olefin feed are fed to the former decobalting zone, and the former primary reaction zone now becomes the decobalting zone, and the product from the latter zone going to the hydrogenator. Thus by periodic reversal of the function of the two reactors, it is possible to operate continuously with a fixed bed catalyst with substantially little loss of cobalt from the system.

One drawback that the system briefly described above has is the problem of reactor plugging. Experiments have shown that when such a solution of oxygenated products is transferred from the primary reaction zone to the decobalting zone, most of the cobalt is deposited in the packing at that point in the bed where decobalting temperatures, 300°–400° F. are first encountered. Thus decobalting, instead of being uniform throughout the bed, is concentrated at and near the area where the feed from the primary reactor enters the decobalting vessel, and plugging of feed inlet lines and adjacent portions of the decobalting vessel result. This would require stoppage of operation for removal of the plugged material and also short cycles. It has been calculated on a basis of 100 barrels/day of olefin feed containing 0.1% by weight of cobalt as catalyst that plugging would be encountered in the decobalting vessel in less than a week.

It is the purpose of the present invention to provide a method for increasing the length of the cycle in the alternate-type of operation in which the primary reactor and the decobalting vessel may alternately exchange their functions. Another purpose of the invention is to prevent plugging of the decobalting vessel when liquids containing dissolved cobalt carbonyl are pumped into it. A third purpose of the invention is to provide uniform distribution of the precipitated cobalt throughout the decobalting vessel. Other purposes and advantages of the invention will become apparent from the description hereinafter.

It has now been found that plugging may be substantially prevented in the decobalting vessel and the cycles considerably lengthened by injecting the feed from the primary reactor into the decobalting vessel at more than one of several distinct zones. The process utilizes two fixed bed reaction stages in series, each of which is provided with a plurality of reaction zones and liquid feed inlets. Each reactor is packed with catalytically inert material, such as silica gel, Raschig rings, charcoal, pumice, etc., which may support a cobalt type catalyst. In operation, olefin feed is fed to the initial reactor through which synthesis gas is recycled. The liquid carbonylation reaction product and dissolved cobalt carbonyl are then fed to a plurality of zones in a second reactor through which hydrogen is recycled. The first stage product may be fed to each zone of the second stage reactor simultaneously or consecutively, that is, first to one zone until plugging occurs, then to the second zone, etc., and in this manner a uniform deposit of cobalt may be obtained throughout the second stage reactor on the catalyst support in that reactor. The liquid product from this secondary reaction, or decobalting stage, may be drawn off and cycled to the hydrogenation stage. After the cobalt deposited on the support in the initial reactor is depleted to a predetermined minimum quantity, the flow of the gas and liquid streams is reversed with respect to the initial and secondary reaction stages. The second stage decobalting vessel now becomes the aldehyde synthesis vessel, olefin and synthesis gas now being fed thereto. The aldehyde product from this vessel is now fed to the former first stage vessel, which is now a decobalting vessel, and injected in a plurality of zones in a manner similar to that described above. Thus, by periodic reversal of the function of the two reactors it is possible to operate continuously with a fixed bed catalyst with substantially little loss of cobalt from the system, and, with the use of the zoned reactors of the present invention, these periods between reversals may be substantially lengthened. The length of a decobalting cycle is thus a function of the number of zones in the zoned reactor.

The process of the invention may be more readily understood by reference to the attached drawing which illustrates a preferred embodiment of the invention. Referring to the drawing, a preheated liquid or gas comprising olefins is introduced into primary reactor 1 by means of feed lines 23 and 2. Reactor 1 is packed with catalytically inert material such as Raschig rings, ceramic material, silica gel, charcoal, pumice, kieselguhr and the like supporting a catalyst comprising finely divided metallic cobalt. Carbon monoxide and hydrogen are likewise introduced into primary reaction vessel 1 through lines 3 and 9. The ratio of $H_2$ to CO may vary over wide limits, but preferably is in the range of 0.5–2.0 parts $H_2$ to 1.0 part CO. The synthesis gases pass upwardly through reactor 1 countercurrent to the flow of the olefin, through the bed of cobalt. Reaction zone 1 is maintained at a temperature in the range of from about 150°–450° F., preferably 250°–400° F. and at a pressure in the range of 1500–4500 p. s. i. g.

When the desired conversion of olefins to aldehyde products has been accomplished, reaction products and unreacted liquids and gases are withdrawn from primary reactor 1 through line 4, cooled in cooling zone 5 and introduced into separation zone 7 through line 6. Uncondensed gases are removed overhead from separation zone 7 and are preferably recycled to reactor 1 through lines 8 and 9. These gases may also be withdrawn from the system through line 10. The liquid product, comprising reaction products and dissolved cobalt carbonyl is withdrawn from separation zone 7 by means of line 11 and is passed through line 29 to manifold line 12 leading into secondary reactor or decobalter 13. Secondary reactor 13 is packed with non-catalytic inert material, such as pumice, Raschig rings, kieselguhr and the like, supporting a deposit of finely divided cobalt metal. The liquid product from the separator 7 is injected simultaneously into the decobalting vessel 13 through lines 14, 15, 16, 17 and 18, the total number of injection points and corresponding decobalting zones being determined by the size of equipment, desired length and duration of cycle, etc. Gases comprising hydrogen at pressures and in amounts sufficient to aid in the decomposition of cobalt carbonyl and precipitation of cobalt metal, and in purging the evolved carbon monoxide, are introduced into the bottom of decobalting vessel 13 through line 19. The temperature in reactor 13 is maintained in the range of from about 200° to about 400° F. and the pressure in the range of 100 to 3000 p. s. i. g., preferably 100 to 500 p. s. i. g. In general the time of contact is in the range of about 15 to 60 minutes and longer, before the cobalt is substantially removed from solution. The gaseous reaction products such as carbon monoxide and unreacted hydrogen, are removed overhead through line 20 for further processing to convert CO to methane, and the liquid products now substantially free from dissolved cobalt are removed through line 21 from decobalting vessel 13 and may be transferred to a subsequent hydrogenation stage (not shown) where the aldehyde products may be reduced to alcohols by methods known in the art, or to an oxidation stage (not shown) for conversion to the corresponding acids.

When the concentration of cobalt in the initial reactor 1 is depleted to a predetermined minimum effective limit, the flow of the respective streams entering and leaving zones 1 and 13 are reversed. Under these conditions, olefins are introduced into reactor 13 which is now the initial aldehyde reactor, through line 22 while synthesis gases are introduced into reactor 13 by means of lines 3 and 26. Reaction products are withdrawn from reactor 13 through line 24, passed into cooling zone 5, through line 25 and introduced into separation zone 7. Uncondensed gases and vapors are removed from the system through line 10 or preferably recycled to reactor 13 through lines 8 and 26. The condensed liquid products comprising reaction products and dissolved cobalt carbonyl is withdrawn from separator 7 through line 11 and is introduced into valved injection manifold 28 through line 27, whence they are injected simultaneously into reactor 1 through lines 30, 31, 32, 33 and 34. Hydrogen-containing gases are introduced into the bottom of reactor 1 by means of line 35. When the liquid is substantially free of dissolved cobalt and the carbon monoxide substantially purged and removed overhead along with hydrogen, through line 36, the reaction products are removed from reactor 1 through line 38 and handled as heretofore described.

An alternate and equally effective means for providing uniform distribution of the deposited cobalt in reactor 1 or 13 is the consecutive rather than the simultaneous injection of the cobalt-containing carbonylation reaction product into the decobalter from the manifold 12 or 28. Thus in a cycle where 1 is the primary reactor and 13 is the decobalting vessel, the liquid product from separator 7 may be injected into reactor 13 through line 18 until plugging occurs or decobalting is no longer effective, then the streams are switched and the feed now enters reactor 13 through line 17, etc. Of course, any combination of feeding inlets from the manifold through the feed lines may be employed. When the cycle is alternated, and reactor 1 becomes the decobalting vessel, the feed from manifold 28 to reactor 1 may likewise be consecutive as well as simultaneous. The temperature at the feed inlets to the decobalter may also be controlled to aid in decobalting. The number of injection inlets from the manifold and resulting decobalting zones is only limited by equipment considerations. In general, the greater the number of decobalting zones in a decobalting vessel, the more efficient the process.

To compensate for small but probably inevitable losses of cobalt from the system, small quantities of catalyst make-up, in the form of organic salts of cobalt, such as cobalt stearate, linoleate, oleate, etc. soluble in the olefin may be added with the feed when necessary.

Though the process of the present invention is preferably adapted to the two reactor system in which the flow of streams may be alternated, as described above, the invention may be also adapted to any system of decobalting in which the liquids containing dissolved cobalt carbonyl are passed through a packed reactor and the cobalt deposited on catalytically inert material. Thus if a single reactor be used in the carbonylation reaction, the liquid aldehyde product containing dissolved cobalt carbonyl may be sent to a storage zone until the cobalt metal in the reactor reaches a predetermined minimum, and then the liquid products may be fed back to the reactor through a plurality of inlet lines under decobalting conditions in the manner described above to lengthen the period before reactor plugging begins.

While the foregoing description and exemplary operations have served to illustrate specific applications of the invention, only such limitations should be imposed on the invention as are indicated in the appended claims.

What is claimed is:

1. In a continuous carbonylation process wherein carbon compounds containing olefinic double bonds, carbon monoxide and hydrogen are contacted in an initial reaction zone with an active carbonylation metal catalyst under conditions to produce reaction products comprising oxygenated olefinic compounds containing at least one more carbon atom than said carbon compounds and wherein catalyst metal compounds are dissolved in said reaction products, and the solution comprising said reaction products and the therein dissolved catalyst metal compounds is transferred to a catalyst removal zone wherein said dissolved catalyst metal compounds are removed and catalyst metal is deposited on at least one stationary bed of solid carrier material under catalyst removal conditions from said reaction products, the improvement which comprises maintaining a plurality of spaced zones within the single confined space defined respectively by said reaction and catalyst removal zones, maintaining a temperature of about 250° to 400° F. in said reaction zone, and injecting said solution comprising said products and dissolved catalyst metal compounds at more than one of a plurality of injection points spaced in the direction of the flow of said reaction products through said catalyst removal zone.

2. In a continuous carbonylation process wherein carbon compounds containing olefinic double bonds, carbon monoxide and hydrogen are contacted with an active carbonylation metal catalyst to produce oxygenated products containing at least one more carbon atom than said carbon compounds and where the carbonyl of the metal catalyst is formed and in which process two reaction zones containing catalysts are maintained in series, and in which carbon compounds containing olefinic double bonds, carbon monoxide and hydrogen are contacted in an initial reaction zone under carbonylation conditions with an active carbonylation metal catalyst, and where reaction products containing in solution compounds of the metal catalyst are withdrawn from the initial reaction zone and contacted in a secondary reaction zone with hydrogen under conditions to decompose the dissolved metal catalyst compounds and deposit metal catalyst on at least one stationary bed of a solid carrier material and where the flow of streams with respect to the initial and secondary zones are reversed when the catalyst in said initial zone has reached a predetermined critical amount, the improvement which comprises maintaining a plurality of zones within the confined space defined respectively by said reaction zone and catalyst removal zone, maintaining a temperature of about 250 to 400° F. in said reaction zone, injecting said solution into the respective catalyst removal zone at more than one of a plurality of injection points spaced in the direction of the flow of said reaction products through said catalyst removal zone.

3. The process of claim 1 in which said solution is injected into said catalyst removal zone consecutively at different injection points.

4. The process of claim 1 in which said catalyst metal compounds dissolved in said carbonylation reaction product comprise metal carbonyls.

5. The process of claim 1 in which said active metal carbonylation catalyst comprises cobalt.

6. The process of claim 2 in which said solution is injected into said catalyst removal zone consecutively at different injection points.

7. The process of claim 2 in which said catalyst metal compounds dissolved in said carbonylation reaction products comprise metal carbonyls.

8. The process of claim 2 in which said active metal carbonylation catalyst comprises cobalt.

JOSEPH K. MERTZWEILLER.

References Cited in the file of this patent

UNITED STATES PATENTS

| Number | Name | Date |
|---|---|---|
| 2,250,421 | Riblett | July 22, 1941 |
| 2,324,746 | Weinrich et al. | July 20, 1943 |
| 2,327,066 | Roelen | Aug. 17, 1943 |
| 2,464,916 | Adams et al. | Mar. 22, 1949 |
| 2,503,356 | Sensel | Apr. 11, 1950 |
| 2,508,743 | Bruner | May 23, 1950 |

OTHER REFERENCES

U. S. Naval Technical Mission in Europe, "The Synthesis of Hydrocarbons and Chemicals from CO and $H_2$," pp. 120–122, Sept. 1945.

Fiat Final Report No. 1000, pp. 12, 13, 17 and 18. "The Oxo Process" by Holm et al. (PB–81383), Dec. 26, 1947.